United States Patent
Boudville

(10) Patent No.: US 10,503,533 B2
(45) Date of Patent: Dec. 10, 2019

(54) APP STREAMING, BIDIRECTIONAL LINKET, PHONE NUMBER FOR MOBILE DEEP LINKS

(71) Applicant: Wesley John Boudville, Perth (AU)

(72) Inventor: Wesley John Boudville, Perth (AU)

( * ) Notice: Subject to any disclaimer, the term of this patent is extended or adjusted under 35 U.S.C. 154(b) by 1012 days.

(21) Appl. No.: 14/998,440

(22) Filed: Jan. 4, 2016

(65) Prior Publication Data
US 2017/0195397 A1 Jul. 6, 2017

(51) Int. Cl.
*G06F 9/455* (2018.01)
*G06Q 30/02* (2012.01)
*H04W 4/50* (2018.01)
*H04W 4/60* (2018.01)
*G06F 16/95* (2019.01)
*H04L 29/06* (2006.01)

(52) U.S. Cl.
CPC .......... *G06F 9/45558* (2013.01); *G06F 16/95* (2019.01); *G06Q 30/0246* (2013.01); *H04W 4/50* (2018.02); *H04W 4/60* (2018.02); *G06F 2009/4557* (2013.01); *G06F 2009/45595* (2013.01); *H04L 63/101* (2013.01)

(58) Field of Classification Search
CPC ......... H04N 21/21805; H04N 21/4788; H04N 21/6587; H04N 21/812; H04N 21/2343; H04L 67/10; G06Q 30/0207–0277
See application file for complete search history.

(56) References Cited

U.S. PATENT DOCUMENTS

| | | |
|---|---|---|
| 8,433,800 B2 | 2/2011 | Chor |
| 2003/0229779 A1* | 12/2003 | Morais ............... H04L 29/12009 713/153 |
| 2013/0110815 A1 | 5/2013 | Tankovich |
| 2013/0124606 A1* | 5/2013 | Carpenter ............... H04L 67/06 709/203 |
| 2013/0334300 A1 | 12/2013 | Evans |
| 2014/0089413 A1 | 3/2014 | Evans |
| 2015/0154644 A1 | 6/2015 | Saxena |
| 2015/0156061 A1 | 6/2015 | Saxena |
| 2017/0087464 A1* | 3/2017 | Perry ..................... A63F 13/355 |

* cited by examiner

*Primary Examiner* — Chrystina E Zelaskiewicz
*Assistant Examiner* — Chinyere Mpamugo

(57) ABSTRACT

An app store can have a multiuser streaming app. A thin front end appears on the user devices and the rest of the app instances run in virtual machines in a data center of the app store. A web page at an URL Phi can contain a linket Theta. Phi is seen in a mobile browser. If Theta is picked, the mobile device sends Theta and Phi to the Registry. The Registry logs both. Future analysis of the log tells where (Phi) the linket appeared. A bidirectional capability. The app server for the linket can also get Phi, and use the pair for similar analysis. An ad server which made an ad containing Theta, which appeared in Phi, can analyse the log to measure the efficacy of posting the ad to Theta. Phi can also be an app.

10 Claims, 11 Drawing Sheets

APP STREAMING, BIDIRECTIONAL LINKET, PHONE NUMBER FOR MOBILE DEEP LINKS

REFERENCES CITED

"Apps everywhere but no unifying link" by C. Dougherty, New York Times, 5 Jan. 2015.

"Deep linking's big untapped potential" by M. Thomson, VentureBeat.com, 9 Aug. 2015.

"Generating and presenting deep links" by V. Tankovich et al, US Patent Application 20130110815 (Oct. 28, 2011).

"Methods and systems for facilitating an online social network" by C. Evans, US Patent Application 20140089413 (Dec. 6, 2013).

"Text-synchronized media utilization and manipulation based on an embedded barcode" by C. Evans, US Patent application 20130334300 (Mar. 27, 2013).

"Smart link system and method" by J. Chor, U.S. Pat. No. 8,433,800, (28 Feb. 2011).

"Deep linking to mobile applications" by S. Saxena et al US Patent Application 20150154644 (Dec. 2, 2013).

"Deep linking to mobile applications" by S. Saxena et al US Patent Application 20150156061 (Dec. 2, 2013).

TECHNICAL FIELD

Deep links for mobile apps.

BACKGROUND

Mobile apps have a distinctive problem. Most are currently standalone programs that often just converse with an app server run by the company that wrote the app. The apps do not have URL links within them. In general, an app from one company does not interact with an app from another company.

Separately, it is much harder for a search engine, which is optimised to search the Web for webpages, to search arbitrary apps. There is no standard syntax equivalent to an URL or URI to enable this.

To enable such and other functionality in mobile apps has been termed 'deep linking' within apps. (The term also has an earlier use that refers to standard web pages and URL links within them. This submission does not use that earlier meaning.)

Major companies have several projects aimed at defining deep links. Facebook Corp. has App Links. Google Corp. has App Indexing and Google Intents. Twitter Corp. has App Cards. Apple Corp. has Apple Extensions. Yahoo has 2 US patents pending. There are also several startups, like Bit.ly, Branch Metrics Corp., Button Corp., Quixy Corp., URX Corp., and Tapstream Corp., each with their own initiatives. The syntax and functionality vary between these company specific efforts.

We recommend that if the reader is new to the idea of deep links to read 2 articles. "Apps everywhere but no unifying link" by C. Dougherty, New York Times, 5 Jan. 2015. And "Deep linking's big untapped potential" by M. Thomson, VentureBeat.com, 9 Aug. 2015. Both at least at this time of writing are available online. They are well written. The first article is accessible to the general reader. The second article has slightly more technical details. They give an understanding of deep links and the business potential, as understood publicly in the prior art of 2015.

SUMMARY

A linket is a label for a deep link. A deep link is at minimum 2 items. An id of an app and a network address or domain where the app is run. Often the app runs on a mobile device. The address is assigned to the device by the wireless provider or WiFi hot spot. A raw address is hard to remember. And it can change as the user moves. A linket functions like a domain name. Stable and easier to remember.

A Registry maps from a linket to a deep link. The analog of the DNS system. But whereas the mapping from a domain to an IP address is expected to be stable over months, the deep link address can change over hours.

An app store can have a multiuser streaming app. A thin front end appears on the user devices and the rest of the app instances run in virtual machines in a data center of the app store. To minimise delays, the virtual machines are in the same data center. Also, if the app server can host streaming apps, the app store might migrate the virtual machines to the data center of the app server, if this further reduces the total latency between the user devices.

A web page at an URL Phi can contain a linket Theta. Suppose Phi is seen in a mobile browser. If Theta is picked, the mobile device sends Theta and Phi to the Registry. The Registry logs both. Future analysis of the log tells where (i.e. Phi) the linket appeared. A bidirectional capability. Likewise, the app server for the linket can also get Phi, and use the pair for similar analysis. An ad server which made an ad containing Theta, which appeared in Phi, can analyse the log to measure the efficacy of posting the ad to Theta. Phi can also be an app. An extension is where Phi has a parameter indicating the "page" or data file in its database in which the linket is in.

A deep link can have a phone number instead of an Internet address. If the phone accesses the Internet via a phone carrier, then a device getting the deep link can ask the carrier for the Internet address that it assigned to the phone. Or if the phone uses a hot spot, the device can ask the carrier, which in turn asks the phone for the Internet address that it got from the hot spot. The phone tells the carrier, which tells the device. In both cases, once the device gets the address, it can use this with the app id from the deep link to contact the phone across the Internet.

DETAILED DESCRIPTION OF THE PREFERRED EMBODIMENT

Figure 1:
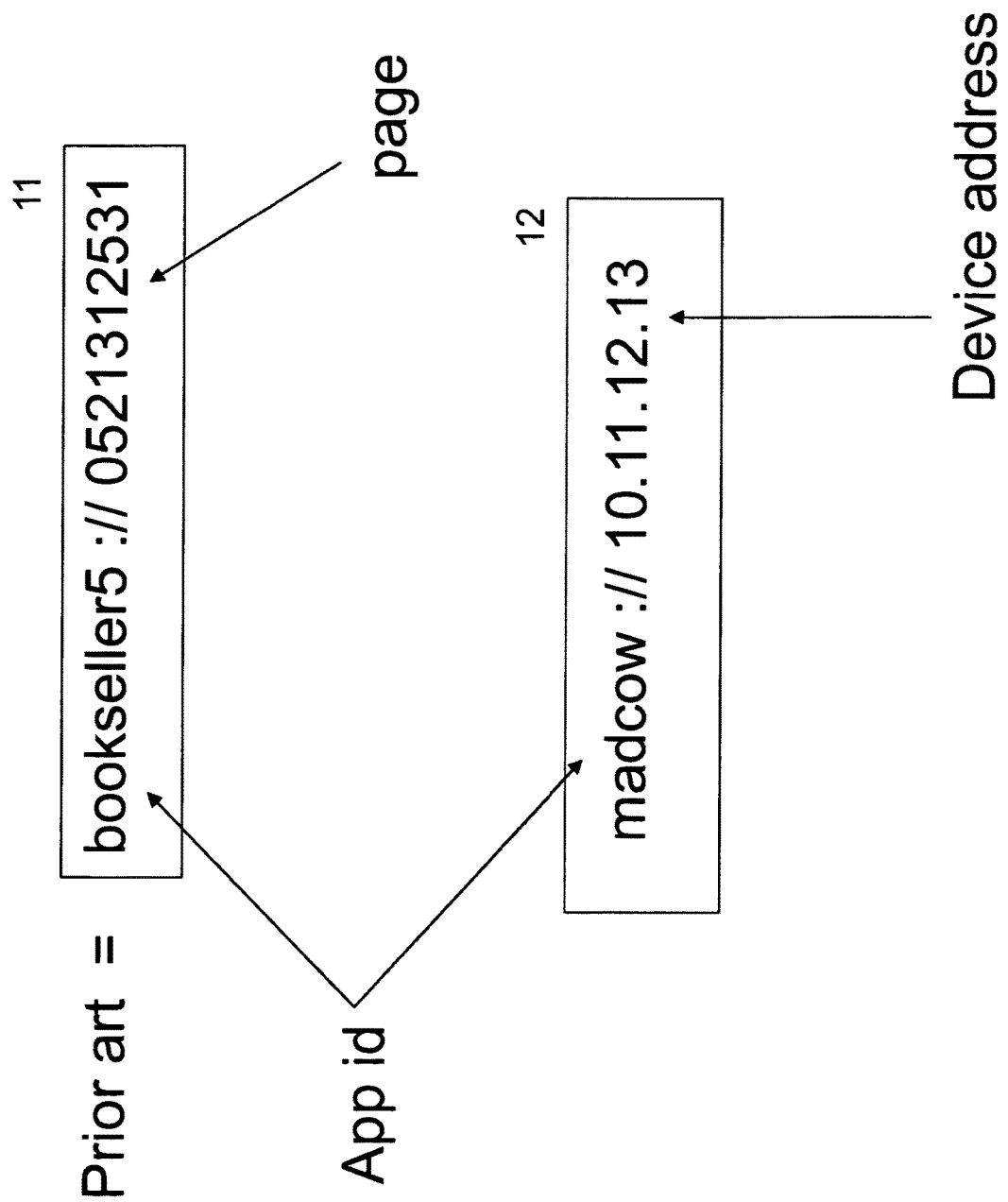
FIG. 1 shows deep links in the prior art and the present submission.

What we claim as new and desire to secure by letters patent is set forth in the following claims.

This submission refers to our earlier submissions to the US PTO: "Cellphone changing an electronic display that contains a barcode", filed 16 May 2011, U.S. Pat. No. 8,532,632 ["1"]; "Using dynamic barcodes to send data to a cellphone", filed 28 Jul. 2011, U.S. Pat. No. 8,348,149 ["2"]; "Transmitting and receiving data via barcodes through a cellphone for privacy and anonymity", filed 4 Oct. 2011, U.S. Pat. No. 8,707,163 ["3"]; "Colour barcodes and cellphone", filed 16 Dec. 2011, U.S. Pat. No. 8,821,277 ["4"]; "Mobile device audio from an external video display using a barcode", filed 25 May 2012, U.S. Pat. No. 8,708,224 ["5"]; "Dynamic group purchases using barcodes", filed 29 May 2012, U.S. Pat. No. 8,655,694 ["6"]; "Chirp to control devices", filed 9 Oct. 2012, US patent application 20140098644 ["7"]; "Barcode-based methods to enhance mobile multiplayer games", filed 22 May 2013, US patent application 20140349746 ["8"]; "Barcode, sound and collision for a unified user interaction", filed October 2013, US patent application 20150113068 ["9"].

We have these co-pending applications for deep linking:

"Deep linking of mobile apps by barcode, sound or collision", filed Feb. 18, 2015, U.S. patent application Ser. No. 14/544,763 ["10"], "Cookies and anti-ad blocker using deep links in mobile apps", filed Jun. 8, 2015, U.S. patent application Ser. No. 14/545,694 ["11"];

"Blockchain and deep links for mobile apps", filed Jul. 28, 2015, U.S. patent application Ser. No. 14/756,058 ["12"];

"Different apps on different mobile devices interacting via deep links", filed Aug. 18, 2015, U.S. patent application Ser. No. 14/756,208 ["13"].

"Linket to control mobile deep links", filed Oct. 19, 2015, U.S. patent application Ser. No. 14/756,815 ["14"].

"Capacity and automated de-install of linket mobile apps with deep links", filed Nov. 10, 2015, U.S. patent application Ser. No. 14/757,027 ["15"].

"App social network via linket and ads for mobile deep links", filed December 2015, US patent application ["16"].

"App group, ad bandwidth, hand off for linket and mobile deep links", filed December 2015, US patent application ["17"].

We described deep links and ways that these could enhance interactions between two mobile devices near each other. The current submission describes a higher level of use of deep links.

We define some terminology.

This submission is mostly about mobile devices carried or worn by people. The most common mobile device is a cellphone. We take this word to also include "smartphone". The latter term arose to describe a cellphone that also had a camera and Internet access, when such features were relatively new to cellphones. Other types of mobile devices are tablets, laptops, notebooks, netbooks, PDAs and wearable devices.

We will make frequent references to "app store" and "app server". Despite the similarity in names, these are different entities. An app store is typically run by a maker of a mobile device (like Apple Corp., Microsoft Corp.), or a provider of an operating system for mobile devices (like Google Corp.). Software companies that make mobile apps submit these to an app store. So users can find the apps in the app store and download them to the mobile devices. An app server is a server run by one of those software companies. A mobile user can use her device browser to go to the website of the app server, to download the app.

When we later describe an instance of an app interacting with an instance of another app, we might say, for brevity, a statement like "the first app interacts with the second app", when strictly it should be "an instance of the first app interacts with an instance of the second app". There should be no confusion with the use of the shorter phrase. But when 2 instances of an app interact with each other, a more precise phrasing is needed, like "a first instance of the app interacts with a second instance of the app".

Related to this is a notational convenience. We shall refer to an app, and call it Alpha, for example, in the text and figures. Sometimes "Alpha" shall mean the app executable. Other times, it shall mean the id of the app, where the id is unique across "all" apps. In turn, "all" might mean across all apps in an app store for a given hardware platform. Or across all hardware platforms.

This submission has the following sections.

1: Earlier submissions;
2: Alternative deep link;
3: Privacy;
4: App Streaming;
4.1: Prior Art;
4.2: Deep Link;
4.3: Multiple Data Centers;
4.4: Move to App Server;
4.5: More than 2 Users;
5: Bidirectional linket;
5.1: Blacklist and Whitelist;
5.2: Rating a linket using webpages and apps;
6: Transient deep link;
7: Telephone number in deep link;
7.1: Use phone carrier to access Internet;
7.2: Use hot spot to access Internet;
1: Earlier Submissions;

This submission extends our work in submissions 14, 15, 16 and 17 on linkets. We encourage the reader to read those for a fuller discussion of linkets. In this section, we summarise that earlier work.

The prior art uses "deep link" to mean two apps running on one mobile device. The first app has a deep link which is selectable by the user. When the deep link is selected, something happens to cause the second app to be installed on the device. Since typically the second app is not present. The second app is run, with an input argument which causes it to start up and show a particular item or "page", rather than just a generic "home page". The "something happens" refers to different ways that different companies have, to enable this.

FIG. 1 is FIG. 1 of submission 14. Item 11 is a deep link in the prior art.

Our deep link, as defined in submissions 10-17, is fundamentally different. It lets 2 mobile devices interact. One major category for us (and not for the prior art) is one app running on 2 mobile devices. By one app, we mean 2 instances of the app. Another category is 2 apps running on 2 mobile devices. One app runs on one device, another app runs on the other device, and the apps interact across the network. Our deep link is for (though not exclusively) multiuser interactions. The category of one app on 2 devices can be for multiplayer games. Or even a single player game, where the second device runs a second instance of the game in spectator mode. The second device screen shows the game window of the first device. But the second device cannot alter the game position on the first device. Read only. (There are some caveats for situations where the second device might make some alterations.)

Item 12 is a deep link from our submissions. It has an id of an app, "madcow". But it also has a network address, 10.11.12.13, of a device (like a cellphone) running an instance of madcow. The address is hypothetical and represents any Internet Protocol version 4 address. It also represents an IPv6 address.

Suppose madcow is a two person game. The first person, Jane, has her phone at that Internet address. She starts madcow. She needs a second player. She picks an option in the game that makes the deep link 12. She sends this perhaps via an electronic message (e.g. email, SMS) to Bob. In general, he does not have madcow installed on his device. He reads the message in a mobile browser. The browser shows the deep link as a clickable link. Bob clicks it. The browser, perhaps in tandem with the device operating system, installs madcow and runs an instance. Giving it the input 10.11.12.13. This tells Bob's madcow instance to connect to another madcow instance at that address. Which happens to be Jane's instance. Her instance is listening at a port for Bob's instance. Because these are instances of the same app, the port number can be hardwired into the app. Or the port number can be found from the app server when both instances boot and contact the app server. We assume the common case where the app connects to an app server.

Jane and Bob now play the game.

We define a "linket" to be the label of a deep link. The linket can be expressed in Unicode. The linket can be case sensitive. Unlike domain names. This improves the readability of expressions. Case sensitivity is moot for languages like Chinese or Hindi which do not have the concept. The linket can have (but not necessarily) white space.

The linket lets individuals have a personal brand associated with themselves. This follows the observation that many (most ?) people in many countries now have cellphones. A user's cellphone becomes an extension of herself, as has been observed. It is the most common type of personal computer in the world.

Hence a person can own a linket. Of course, a corporation can also own a linket.

Another trend observed is the rise of the so-called gig economy, as exemplified by companies like Uber, Lyft and Airbnb letting individuals offer their services. Where the labour market tends to a friction free state. Our linket and the personal branding it offers is another enabler of the trend. However, the hardware barrier to entry of a person owning a linket is much cheaper. For Airbnb, the user needs to own (or rent) a home. To own can cost over $US300 000. For Uber, the user needs to own or rent a car. To own can cost $US20 000. In contrast, to use a linket requires a cellphone. A top of the line phone can cost $US600. One to two orders of magnitude cheaper than the other cases.

For descriptive simplicity in what follows, we shall write the linket as a string enclosed in quotes. This is meant to describe its string contents in an understandable way that is independent of a choice of format.

2: Alternative Deep Link;

In submission 10 we introduced our definition of deep link, where it had at minimum an app id and a network address of an instance of the app. This section considers an alternative deep link structure. It has an app id. But instead of the network address, it has an alias of that address. See FIG. 2. The top half shows Jane and her device as item 21. And Bob and his device as item 23. With the Alpha app server 22. As in submission 10, Alpha is imagined to be a multiuser app and Jane is the first user. She wants to find a second user, Bob.

Step [1] is her app instance connecting to the app server. The app server replies with various setup information. It takes her network address, 10.20.30.40, records it in an internal table 24 and maps it to an alias, xyz. The table has the mapping from the address to the alias. It is part of the app server, though it is shown separately and explicitly for clarity.

The alias is returned in step [2]. The step might have any other typical startup information. In step [3], Jane's app instance makes a deep link, of this format—"alpha://xyz". The alias supplied by the server is used instead of her explicit network address.

By various means described in our earlier submissions, step [3] sends the deep link to Bob's device. Note that here, Jane's device does not know the network address of his device. Her device might know his email address or phone number, and it sends the deep link in an email or SMS. Or if the devices are near each other, her device can make a barcode (like a QR code) of the deep link. The barcode is shown on her device screen. His device has a camera, which takes a photo of the barcode and decodes it.

Bob's device uses the alpha in the deep link to install alpha (assuming it was not already installed). Step [4] is where his device goes to the app server as part of the usual startup. But it also uploads the alias xyz. Step [5] is where the server replies with the actual address of Jane— 10.20.30.40. After which the 2 app instances interact directly, as well as with the server.

Figure 2:
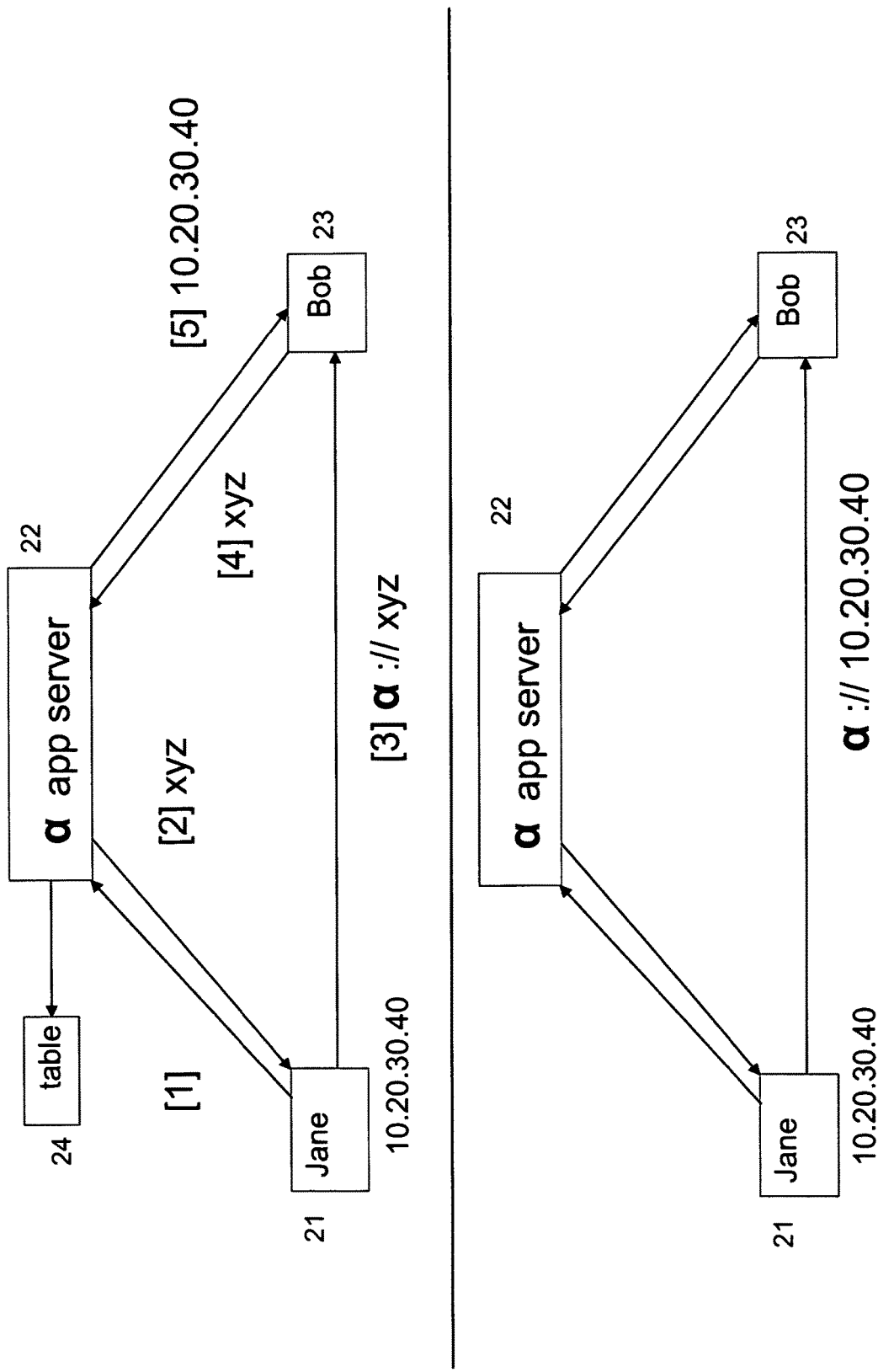
FIG. 2 compares a deep link with an instance address with an alternative.

The lower half of FIG. 2 is our method from submission 10. The arrows to and from Jane's device to the app server are the usual startup interactions, independent of any use of deep links. Likewise with the arrows to and from Bob's device and the app server. We can see that her address is used directly in the deep link sent to Bob. And table 24 is not needed.

The reader can appreciate that the method from submission 10 is simpler to understand and implement. There is less work for the app server, for instance. It does not need to make an alias and relate it to Jane's address.

However, one possible advantage of the current method is how it conceals Jane's device address. If the deep link is transported via email or SMS or any other transport mechanism, these might send the deep link as plaintext. She may not want her address read by eavesdroppers.

We describe the alternative system here in part to emphasise the advantage of our earlier approach.

3: Privacy;

Multiple users of an app, playing (or using) the same "game" can have an enhanced privacy option. If the users use linkets or deep links to find each other's network addresses, they can communicate directly. The app could be written to let users send messages (text, audio, images, video) via this means. Thus a given user might have an area of her app which shows messages she got and maybe also those she sent to others. But these messages never reached or came from the app server.

The app might also have a messaging option that sends a message via the server.

The point is that if the app is written so that it does not send a copy of the "direct" messages to its server, then this gives more privacy to the game or interaction.

An issue is whether it is desired by the users to have a record of the direct messages. The app can have an option to let a user store these on her device. At least, the messages she wrote and those she got. A possible scenario is for multiple conversations to happen via the direct messages, where each conversation is only between some users. So others not in the conversation cannot see the messages.

4: App Streaming;

4.1: Prior Art;

Recently Google Corp. released a version of this for apps in the Google app store. Essentially, if Jane wants to run the app on her mobile device, she does not have to download it first. She finds the app in the app store and picks it for running. The app store starts the app in a virtual machine that runs in a physical computer in a data center. A lightweight graphical front end appears on Jane's device. It is equivalent to what she would see if she first downloaded the app to her device and ran it in the usual manner for most apps. If she manipulates the front end of the streaming app, signals are sent back to the app executable in the virtual machine in the data center. Most functionality runs in the virtual machine, with only a minimum of executable code downloaded to her device.

The advantages to her are three fold. First, she does not need the free space on her device to hold the downloaded app. Second, she does not use up a lot of bandwidth to download. This can eat into her data plan if her device is a phone and she accesses the Internet via a carrier that imposes a limit on her bandwidth use. Third, she does not need to delete it if she decides not to use it anymore.

4.2: Deep Link;

The existence of app streaming causes some changes to our use of a deep link in our first deep link submission 10.

Figure 3:
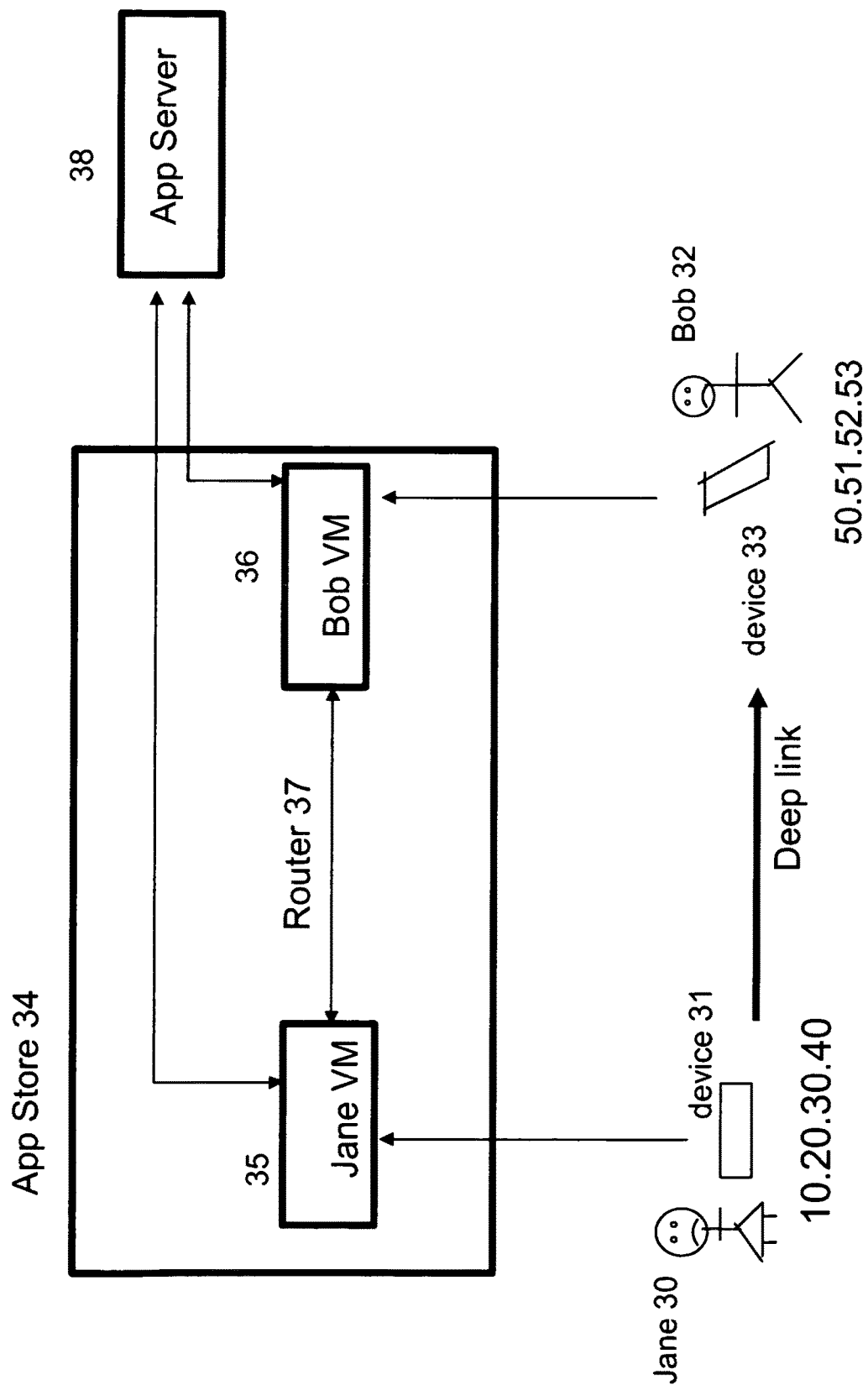
FIG. 3 shows 2 users interacting with app streaming and a deep link.

See FIG. 3. There is an app Alpha that has its app server 38. The app can be downloaded from app store 34. Here by app store 34, we mean the data center at which the app store is located. (For now, suppose there is only one physical data center.)

Jane 30 has her mobile device 31 at a network address 10.20.30.40. Alpha can be used in a multiuser mode. Jane runs Alpha as a streaming app. In the app store, this is shown as Jane VM 35. Here we simplify the graphics of the figure. Her instance of the app would run inside a virtual machine. But for clarity, we depict her instance and its enveloping virtual machine as one entity. There would be some front end of Alpha that runs on her device 31. Her Jane VM 35 also talks to the app server 38.

She needs a second user to interact with. She runs her Alpha instance and picks an option it offers to make a deep link. The deep link is made as "alpha://10.20.30.40". The address in it is preferably her network address on the real Internet, and not one that might be of a node in a fictitious network inside the app store data center. Where we say that her Alpha instance makes the deep link, the instance is distributed over a small front end on her device and the rest in Jane VM 35. The Jane VM 35 is assumed to have access to her real network address.

Once the deep link is made, it is transferred to Bob's device 33 by various means described in our earlier submissions. If she has an electronic address of him, she can send it to that address. So it can be by email or SMS, for example. If they are nearby, she can make a barcode of it, show the barcode on the screen of her device. Bob scans it with his device, which decodes to get the deep link. Or she can play an audio that his device decodes for the deep link. Or they bump devices so that he gets the deep link via a collision server.

Bob's device gets the deep link. Suppose in the general case that his device does not already have Alpha installed. His device sends the deep link to the app store 34. Now instead of doing an install on his device 33, as per submission 10, the app store makes a virtual machine for Bob. It starts up an instance of Alpha in that virtual machine and gives it the address of Jane's instance. Thus we have Bob VM 36, which describes both his virtual machine and the Alpha instance inside it. A thin front end of the app is downloaded to his device, in the same manner as for Jane. His app instance then sends a message to Jane's instance, to the address 10.20.30.40.

FIG. 3 shows Router 37 which routes messages to and from the virtual machines. It sees the outgoing message from Bob's virtual machine to 10.20.30.40. It has a list of the real world addresses of the instances in the virtual machines. The message is not sent onto the real Internet, but is routed inside the data center to Jane VM 35. This minimises the communication time between the app instances. By assumption, her app instance in Jane VM 35 is listening at a port for this network query by another app instance. Whereupon the two app instances interact in some appropriate way. By appropriate, we mean as designed by the app developer.

The use of app streaming means that when Bob's device gets the deep link and runs it, there is no need to install the app if it does not already exist on the machine. His device might still check to see if the app does already exist on the device. If so, then it runs it as per submission 10.

The other difference between using app streaming and not is that here, we get 2 virtual machines in a data center. And the app instances on each VM talk to each other by a network inside the data center.

4.3: Multiple Data Centers;

Section 4.2 described all the events happening in one data center, for simplicity. But an app store might be distributed across several data centers, each center being at a different location. Consider now the scenario where Jane wants to use app Alpha to interact with another person running another instance of Alpha. When she starts Alpha, the app store has to pick a data center in which to run Alpha in a virtual machine. The virtual machine runs on a physical machine in that data center. The app store can pick any of its data centers, depending on various criteria. It might pick a data center closest to Jane.

Jane makes a deep link as earlier, alpha://10.20.30.40. Bob gets it and runs it. His device contacts the app store with the deep link. This message to the app store has his Internet address in the source field. The app store has to decide—where to run Bob's virtual machine?

But there is another step that can be done first. Should Jane's virtual machine be moved to a different data center? Because Bob's virtual machine should also be run in the same data center as her's. Amongst all the available data centers, the app store finds the one that minimises the estimated total travel time between Jane's device and Bob's device. Where this describes a path from her device to the data center and from that data center to Bob's device. The time for a signal to go between the virtual machines inside the data center is expected to be negligible by comparison.

Figure 4:
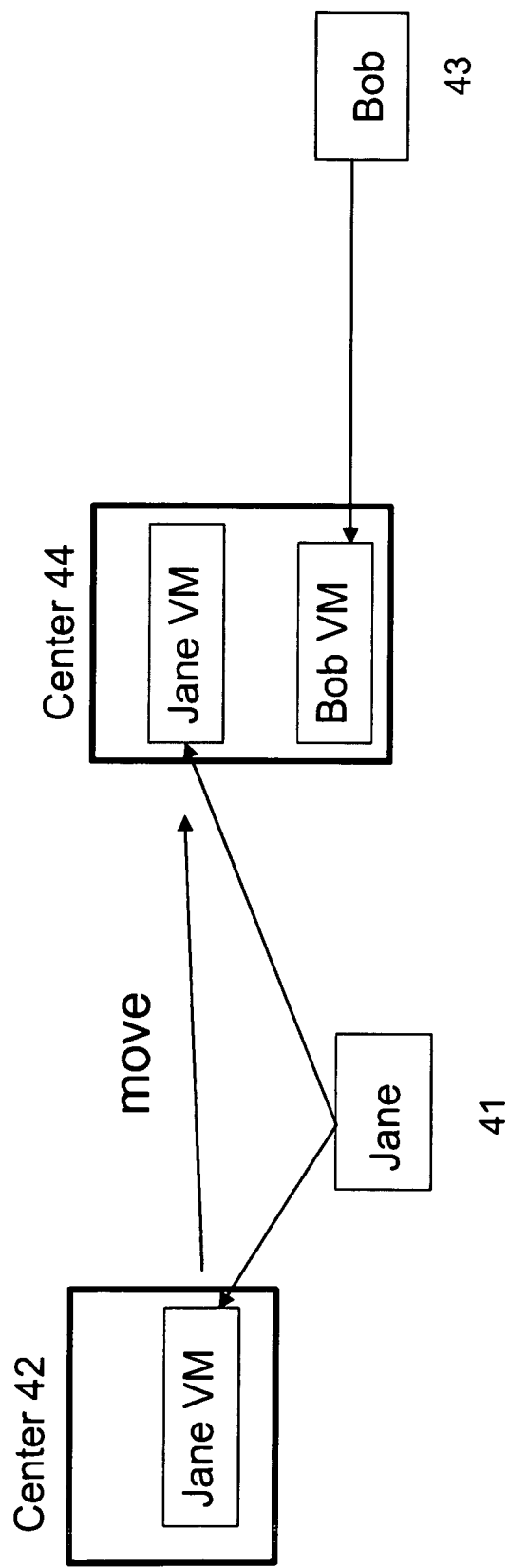
FIG. 4 shows 2 data centers and 2 virtual machines for app streaming.

See FIG. 4. Jane and her device are item 41. She runs the app in streaming mode. The app store has data Center 42, which hosts the app in Jane VM. Bob and his device are item 43. He gets her deep link and runs his instance. First, the app store gets his location, as approximated by using his network address to map to a location. It does likewise for Jane. It notices that it has a data Center 44 located roughly between them. Or it estimates that the total distance from 44 to Jane and Bob is less than the total distance from Jane and Bob to data Center 42. So the app store migrates Jane VM to data Center 44. Then the app store starts Bob VM in data Center 44.

Suppose over several days or longer, Jane uses the same app in streaming mode. The app store can estimate her location each time. And it can keep a record of which of its data Centers her VM ends up in, when she interacts with another user. If it is mostly the same Center 44, say, then the next time she runs the app, the store can put her VM directly in Center 44. This saves the need to migrate her VM.

A simple heuristic.

Now consider when Jane VM and Bob VM are in the same data center. Further optimisation can be done. The center should put the VMs on the same computer. If this is not possible, perhaps because the computer can only hold 1 VM and has no capacity to hold another, then the first VM should be moved to another computer with that extra capacity. If still no such computer can be found, then Bob VM should be put on a computer as close to Jane VM as possible.

Figure 5:
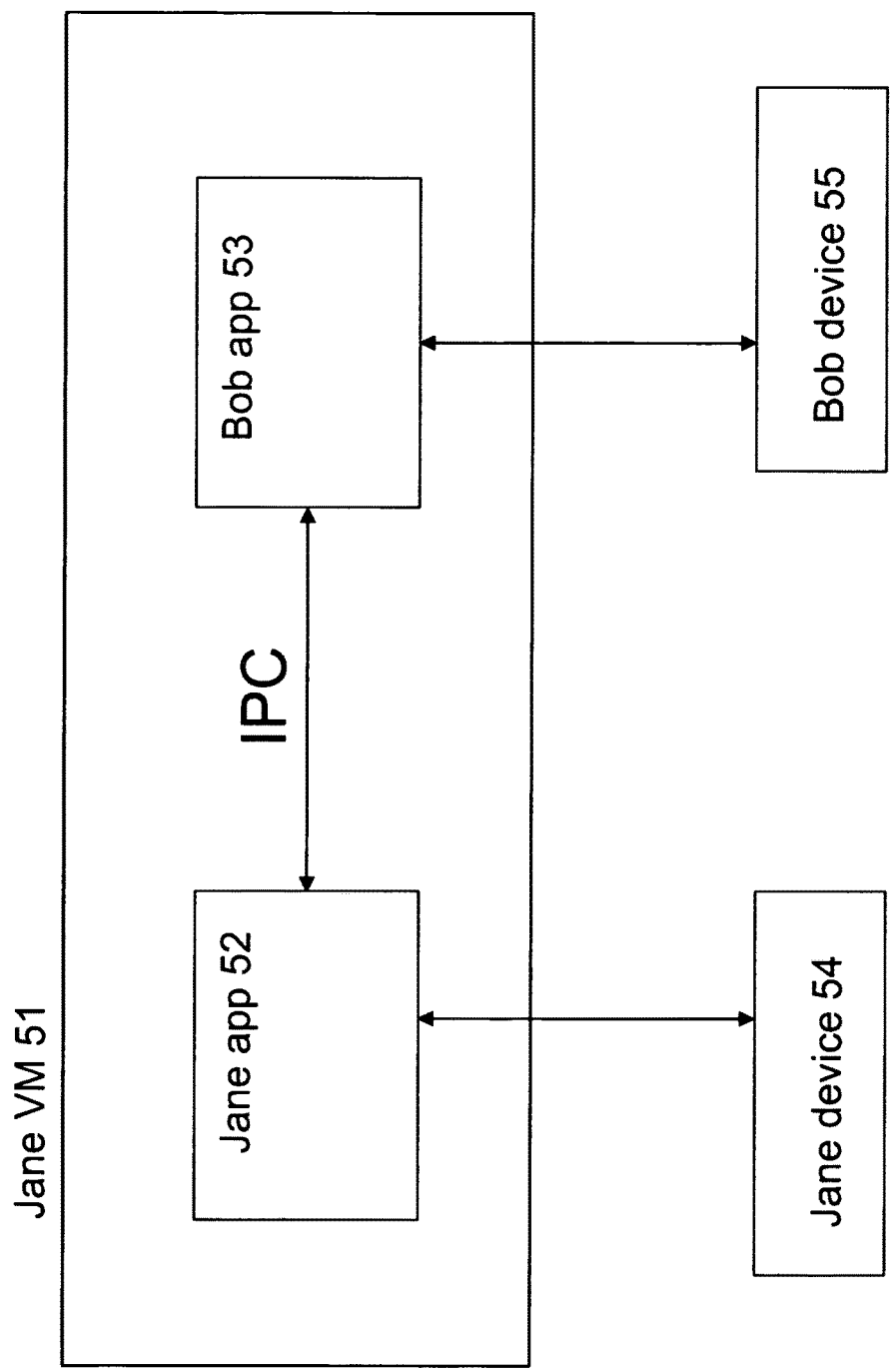
FIG. 5 shows 2 streaming apps in the same virtual machine.

Another optimisation step might be tried. See FIG. 5. Jane VM 51 is a virtual machine holding Jane app 52. The latter talks with Jane device 54. Now, instead of Bob's app instance running in its own virtual machine, it is put into Jane VM 51. See Bob app 53. It talks with Bob device 55. The app instances use inter-process communication (IPC) to talk to each other inside the virtual machine. This may under some circumstances reduce the interaction time between the instances.

An internal router program, that runs inside Jane VM 51, may be needed. When Jane app 52 sends a message to the real world Internet address of Bob device 55, the Router alters the message appropriately and sends this via IPC to Bob app 53. The latter gets the message as coming from the real world Internet address of Jane device 54. Ditto when Bob app 53 sends a message to Jane app 52.

4.4: Move to App Server;

Consider again FIG. 3. Both Jane VM and Bob VM likely often contact the app server 38. The transmission time for each to do this is also a source of delay from the users' perspective. It would be beneficial to reduce this. If the VMs are both in the same data center, as recommended earlier, then the main distances to be traversed are between the mobile devices and the data center, and between the data center and the app server.

Suppose the app server is able to host streaming apps. The app server is physically in a data center, which in general will be different from that of App Store 34. One technique would be for the app store to estimate the transit time between its data center and the app server.

The app store could find the total estimated transit time to go from Jane's device to Jane VM (call this x), from Jane VM to the app server, from the app server to Bob VM, from Bob VM to Bob's device (call this y). One simplification is that the time from Jane VM to the app server is equal to the time from the app server to Bob VM. Call this z. If both VMs are in the same data center, as already recommended, then this is accurate.

Figure 6:
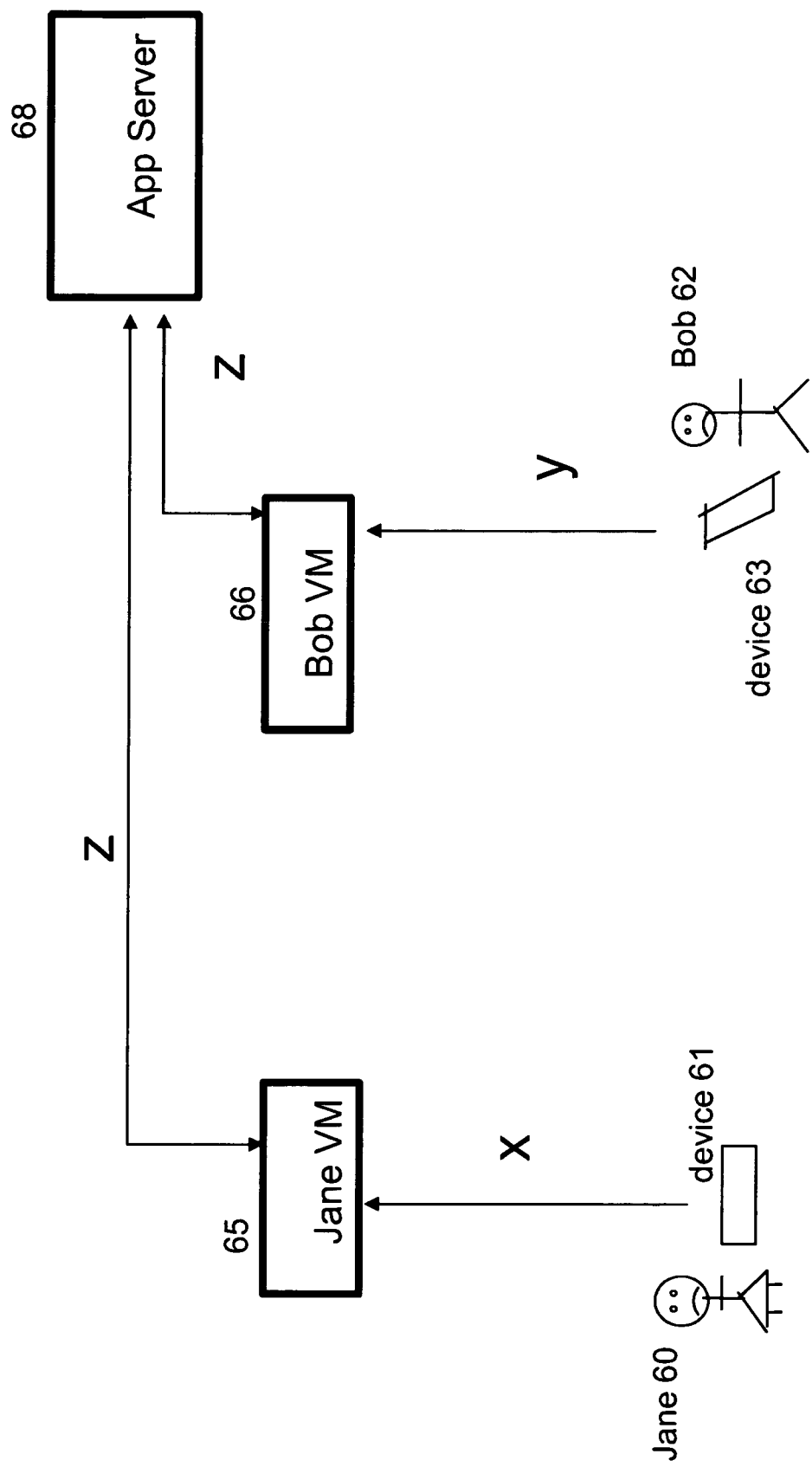
FIG. 6 shows estimates the total transit time between app instances.

FIG. 6 is derived from FIG. 3, where we have simplified to focus on this issue. Here the Jane VM 65 and Bob VM 66 are in a data center; either of the app store or in the data center of the app server. The data center is not depicted in the figure. Both VMs go to the App Server 68.

The total time from a signal to go from Jane to Bob can be estimated as x+y+2z. Of course, if Jane's device directly sends a message to Bob's device, that time is much shorter. But we consider here the case where an action by Jane necessitates an action on the app server, which would maintain a record of the game state. And where the app server then has to send a signal to Bob's device to update it. Likely, the app server also has to send another signal to Jane's device, for which the transit time would be estimated as 2x+2z.

Both estimates ignore computational times needed at the app server.

The app store can use x+y+2z and find which data center minimises this. Where if the data center is that holding the app server, we can take z=0. If the latter data center gives the shortest transit time, then the app store can tell the app server, and the app store migrates Jane VM and Bob VM to the data center of the app server. There might be only one data center for the app server, while the app store has several data centers. If the VMs are migrated to the app server data center, the x and y could increase, compared to when they are in an app store data center. But this increase might be more than compensated by having z=0 in the app store data center. Under these conditions, the migration gives an overall gain in transit time.

Our above step where we ignored the computational time in the app server is justified because this is unlikely to be a function of the locations of the virtual machines. It can thus be estimated to be some average value. Since this does not vary, it is not needed in the above estimate of the transit times, where only variables that vary [sic] need be considered.

Related to this is another approximation that was made. Suppose a signal goes from the thin instance on Jane's device to Jane VM, where the latter is in some data center. Jane VM internally takes some considerable time to compute, before it sends a signal to the app server. And suppose this time will typically be larger than the transmission time from her device to Jane VM. But we can safely neglect this because the compute time should not be any function of the location of the data center.

The above assumed that Bob VM was in the same data center as Jane VM. But Bob VM need not exist at the time of the app store doing the above steps. In practice, Jane VM already exists in some data center of the app store, since Jane is the first user. When Bob's device contacts the app store, the latter needs to make Bob VM. It can or should assume that Bob VM will be in the same data center as Jane VM. It does the above calculations across all its data centers and, most importantly, also for the data center of the app server.

If it finds that putting both VMs in the latter data center gives the lowest latency, it migrates Jane VM to that data center. It tells the app server of this. It can also send a signal to the thin instance on Jane's device, telling it of the new address of Jane VM. Because the thin instance was previously communicating with Jane VM at the earlier data center.

The app store hands off Bob's information (like his network address) to the app server. The app server makes Bob VM in its data center, and it connects directly to Jane VM. The app server data center is assumed to have an internal router program to enable this, just like the app store data centers.

There is a caveat. We used the total transit time of x+y+2z in FIG. 6. This is valid when many of the interactions between the users will contact the app server. But there can be apps where once the app instances do an initial load of data from the app server, most of the later interactions between the instances do not touch the server. The interactions are where the instances send messages to each other's address. So z can be neglected. This puts us back in the earlier sections, where the app store picks one of its data centers to minimise x+y. Now, to that list of data centers can be added the data center of the app server. For the case where even with z=0, the app server data center minimises x+y compared to the app store's data centers.

If Jane VM is migrated to another data center, Jane's device needs to be told of the new address. This can be done by the app store sending a message, where the message comes from a program that is not Jane VM. Or Jane VM once at its new address, can send a message to Jane's device telling of the new address.

4.5: More than 2 Users;

Thus far, we considered only the case of a multiuser app with 2 users. Suppose there are more. There are obvious generalisations. One is that many or all of the users' virtual machines should be in the same data center. The transit time between these is far less than between data centers.

Another aspect is which data center to pick to put most or all of virtual machines. A centroid approach can be taken, where a data center is chosen so that it minimises the total transit time between the users' devices and the center.

Another aspect concerns when the users are joining the interaction. Initially, when say 5 users have joined, a given data center has been picked, based on the previous paragraph. Then 10 more users join. Perhaps based on the locations of these 10 and the first 5, another data center would minimise the total transit time. In this case, the app store might migrate the first 5 virtual machines to the second data center, to the extent that this is possible.

5: Bidirectional Linket;

In the development of the Web, consider a web page at an URL. The page has a link. If the user clicks the link, the browser goes to the web server at the address in the link. The server records the address of the device with the browser. But the server does not know the URL of the page with the link. The link is not bidirectional. Likewise in our submissions, suppose a linket appears in a web page. When it is clicked, this triggers a query to the Registry. But the Registry does not know the URL of the page. It would be useful for later analysis of the Registry log to have this information. In part, to test how popular a given page is, when it shows a linket.

Figure 7:
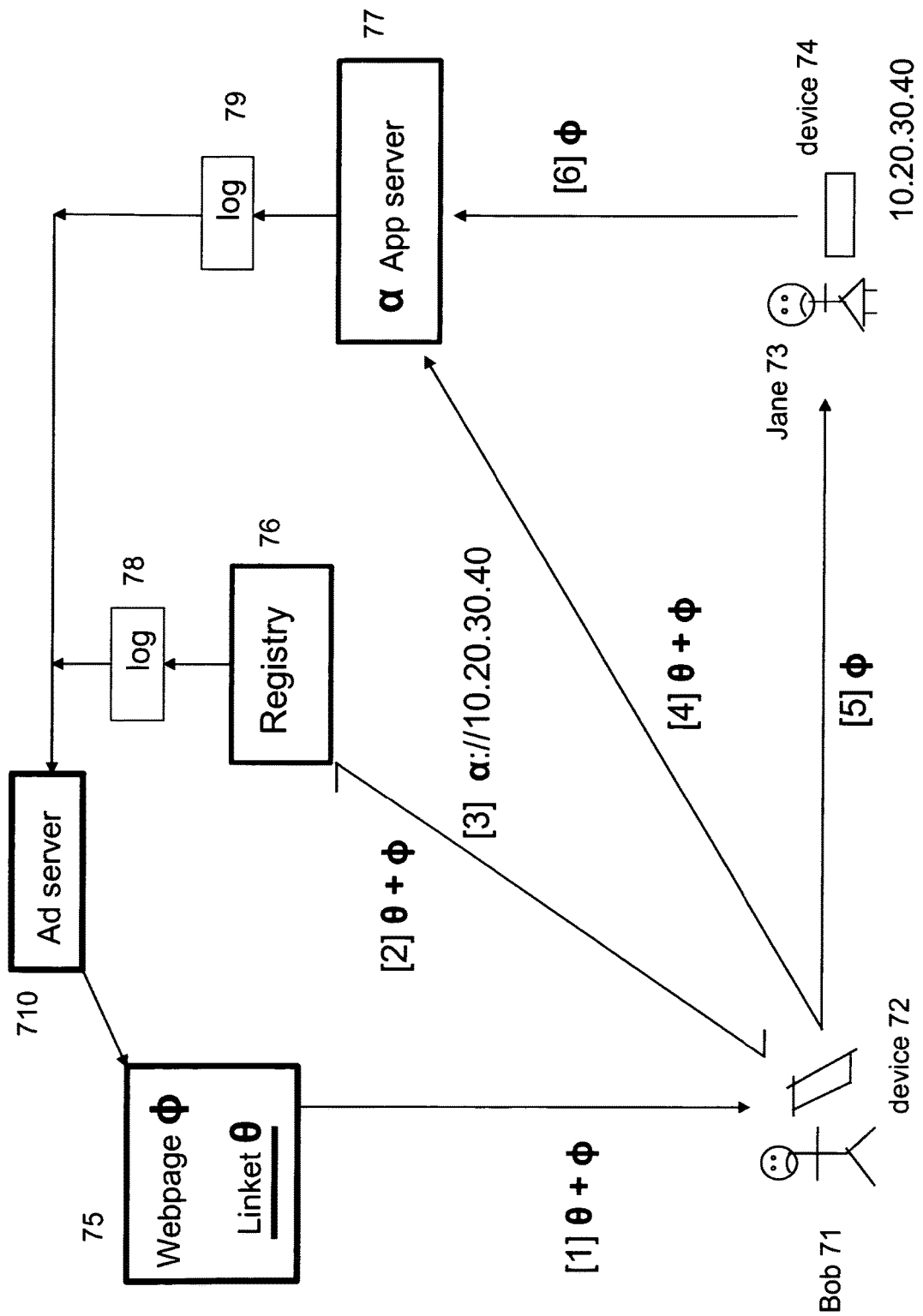
FIG. 7 sends an URL of a page with a linket to the Registry and app server.

See FIG. 7. It shows Bob 71 with his device 72. There is Jane 73 with her device 74. It is assumed to be at address 10.20.30.40. She is running an instance of an app Alpha. Item 75 is a webpage with URL Phi. It has a linket Theta that is owned by Jane. The linket is assumed to be clickable in the browser. This is depicted by the thick horizontal line under the linket. A conventional indicator that there is a clickable link.

The linket can be part of an ad. Whether it is or not, there might be explanatory text, images or audio around it, explaining what clicking the linket can offer or cause. To induce Bob to pick the linket.

Step [1] refers to the webpage being shown in Bob's mobile browser. The label Theta+Phi means the URL and linket are both known to the browser. The plus sign does not signify an arithmetic addition but a grouping.

Suppose Bob clicks the linket in his browser. This causes step [2], a query to the Registry 76. Hitherto, the query would have caused his device to send the linket. Now it also sends the URL Phi. The inclusion of Phi is straightforward, given that the device can already send the linket and that it also knows Phi. There would be some well defined format of the message, that indicates Theta and Phi. In some order, and separated from each other by some means. For example, the first parameter can be Theta, and the second parameter if it exists, which it does in this case, means Phi (the address of the webpage). The format of the message can be defined in public statements issued by the Registry. So developers of applications like Alpha can code to it.

When we said his device could send Theta and Phi, the mobile browser could do this, perhaps in tandem with other programs or the operating system. Collectively, we referred to these in earlier submissions as a Deep Linker.

The Registry can record that it got Theta and Phi from Bob's device address. (His device address is not shown in the figure.) It can write Theta and Phi (and any other ancillary information like a timestamp) to a database called log 78. The log is depicted explicitly in the figure for clarity.

The Registry sends a reply to Bob's device in step [3], with the deep link Alpha://10.20.30.40.

Bob's device installs (if necessary) and runs an instance of Alpha. This instance will contact the Alpha app server 77. Step [4] shows that Theta and Phi can be sent to the app server. The app server can now record that it knows that the linket Theta originated in the webpage at URL Phi. It does this to log 79, which like log 78, is shown explicitly.

Bob's app instance contacts Jane's app instance in step [5]. It can also send Phi. When her instance gets it, it can send Phi to the app server in step [6]. Steps [5] and [6] that end up sending the URL Phi to the app server are slightly redundant, since the server got Phi in step [4]. They are optional. But there may be circumstances where the app server wants this redundancy. Perhaps as a check on the interactions and relationship between the 2 mobile devices.

Three parties get the URL. The Registry, the app server and Jane. Each can use this information. For the app server, its company can find out where its app is being mentioned on the Web. By counting the number of clicks a linket gets at a given web page, the app server gets a measure of popularity of that page with respect to its app. Since Jane owns the linket, she has perhaps the most direct interest in knowing the URL.

A variant of the above is where only 1 or 2 of the parties gets the URL.

Another variant is to note that if the Registry gets the URL and Jane's device does not, she can still later go to the Registry and read the data on her linket use. This is another opportunity for the Registry to garner revenue. Likely, it can develop powerful analysis tools to let linket owners understand their linket usage.

Consider the case where the linket Theta appears in an ad on web page Phi. In some cases, the entire page might be an ad. In either case, the ad might come from Ad server 710. The Ad server could interrogate one or both of log 78 and log 79. Note that there is no requirement that both logs even exist, or that if both do, that they have the linket information. Also, even in this case, the Ad server might only have access permission to one log.

Separately from the issue of permission, the Ad server might only need to analyse one log. It might be redundant to analyse both.

Suppose the Ad server analyses at least one log. It can measure the efficacy of its ad on the web page Phi. Thus in future, it or a person using the Ad server can adjust the content of the ad, or decide whether to continue posting the ad to future versions of Phi. For example, suppose over a period of a month, its ad has appeared in Phi for x number of times. It knows x because each time Phi was shown in a browser, Phi contained instructions executed by the browser that caused a query to the Ad server for the ad. But at the end of the month, the Ad server found y entries in log 78 for Phi and Theta, where y<x. From the specific values of x and y, the Ad server can make the above decisions.

Far more elaborate uses can be devised for the interaction of an ad server with linkets, but the above can act as a simple example.

The reader may recognise that this extends the case where Theta is a conventional URL and where there is no use of mobile apps. From the perspective of an advertiser, our mechanism is a means to extend an existing ad mechanism to mobile apps.

FIG. 7 can be further extended. See again item 75, which is the web page Phi that the linket Theta appears in. Instead of Phi being a webpage, it might be an app. Presumably mobile since it runs on Bob's mobile device 72. Phi is able to show Theta in one of its screens to Bob, as a clickable entity. Or there might be some internal mechanism of Phi, such that during Bob's use of Phi, some action is triggered that invokes Theta. This case has no explicit user interface aspect to Bob. We consider both cases to be equivalent.

Here, when Bob's device sends Theta and Phi to the Registry, by Phi we mean an identifier of Phi. This follows our customary practice in this and earlier submissions where we conflate an app and an identifier of it, for ease of referral in aiding the reader's comprehension.

An extension to the earlier discussion is where Phi also has an extra parameter which designates a "page" or screen within its database, where the linket appears. In perhaps an ironic way, this Phi id=(app id)+(page id), and which might be represented like "alpha://xyz139" is in the format of a typical deep link as currently understood in the prior art by various companies making deep link implementations.

However, in our scenario, the Phi id does not have to be shown as a clickable deep link. In the context of the prior art, there might be not reason to do this. Since the prior art deep link "alpha://xyz139" would appear in a different app, to hopefully be picked by the user and trigger an install of Alpha at that page xyz139. But in FIG. 7, the page already appears on Bob's device. So on that page, there is no motive to display the prior art deep link as clickable.

With one caveat. Imagine where a given 'page' of an app appears on a device. And the user wants to let someone else get a copy of that page. The app can have the option on a page of the page, to make a prior art deep link that points to a copy of the page. Then the deep link (which is just text) can be sent to another user, who picks it in his mobile browser. Causing an installation of the app and the showing of that page. In this case, when the other user sees the page, it is a different instance of the app. And if he does something on the page, this would not interact with the app instance on the first device.

A reason for Phi appending a page id to its app id is where a linket might appear at several places in the running of Phi. The page id gives more information that can later be analysed to determine from which page the linket was invoked. The idea is to give and store as much specific information about a linket use as possible.

5.1: Blacklist and Whitelist;

Suppose the linket appears on a webpage.

Since the Registry knows the URL of the page showing the linket, it might parse the URL against some rules. The rules could be specific to the linket. The rules might have been imposed by the owner of the linket. At the simplest level, she might require that the deep link be returned to the asking device only if the domain in the URL is in some list of domains and raw network addresses furnished by her. This amounts to using a whitelist of approved webpages where the linket appears. Or she can require that the deep link not be returned if the domain or address is in the list. This list acts as a blacklist of undesired domains and addresses. In this case, the Registry might return an error message to the asking device.

Figure 7A:
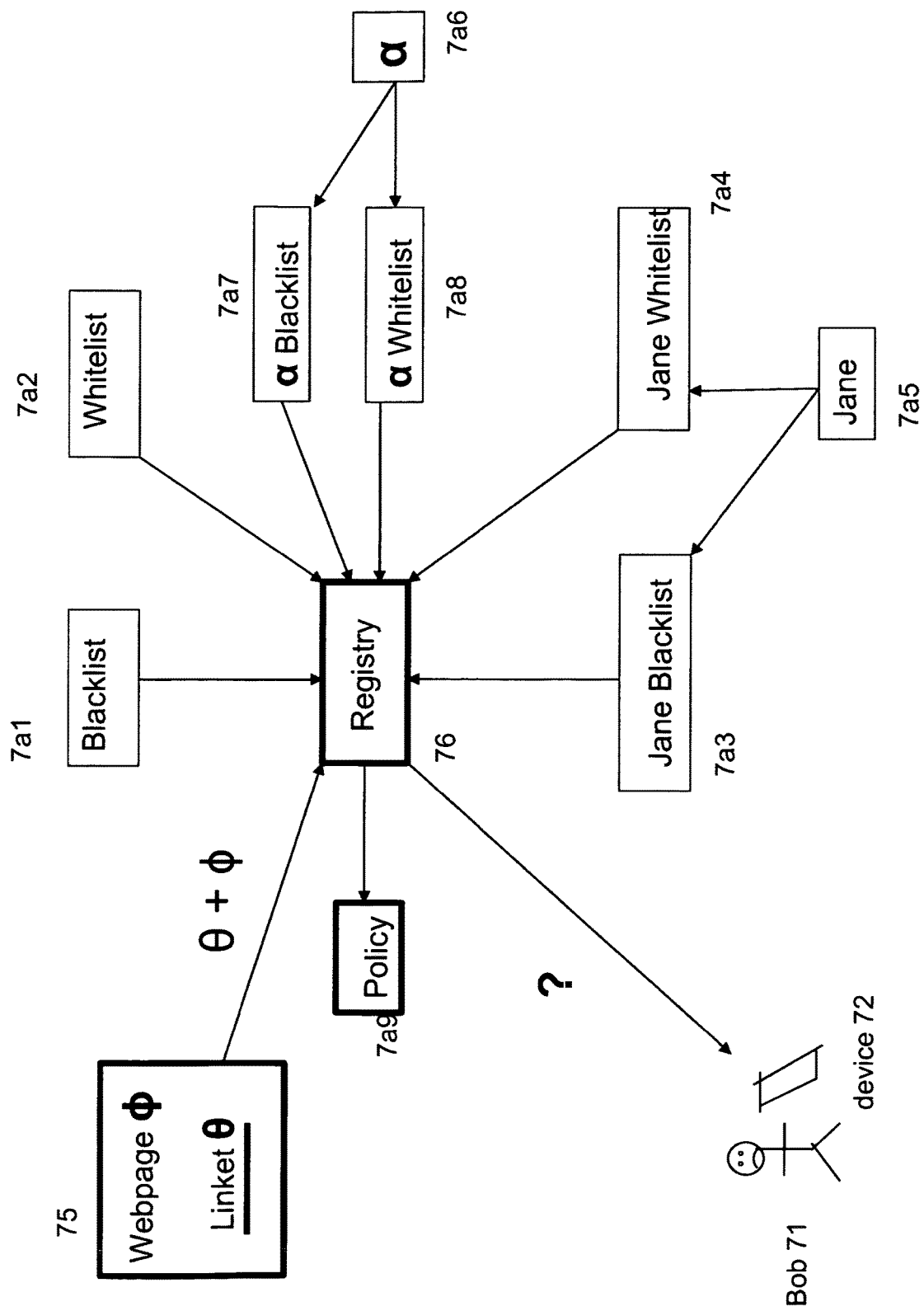
FIG. 7A shows the use of black and white lists by the Registry.

See FIG. 7A. Item 75 and Registry 76 are from FIG. 7. Blacklist 7a1 and whitelist 7a2 are the Registry's lists. These lists are internal to the Registry, but are shown outside it for clarity. Jane Blacklist 7a3 and Jane Whitelist 7a4 are the lists made by the linket owner Jane 7a5. She would use some electronic device to convey these lists to the Registry. The device need not be the mobile device 74 depicted in FIG. 7.

The arrow going from 75 to the Registry is labelled Theta+Phi and represents the combined steps [1] and [2] in FIG. 7. The arrow going from the Registry to Bob's device 72 is labelled "?". This means a decision is made by the Registry, using those lists, as to whether a deep link or an error message is sent.

The linket points to a deep link using app Alpha. The item 7a6 refers to the company that owns Alpha. It can make the Alpha Blacklist 7a7 and the Alpha Whitelist 7a8 and send these to the Registry. The company might also want to impose restrictions as to who might use its app.

There is an interplay between these 3 sets of lists. The Registry would have the final say in how the lists are applied and what happens when a domain or address appears in 2 or more lists. There is or can be a policy engine inside the Registry which mediates the use of the lists. This is item 7a9.

Now suppose the linket appears in an app.

The owner of the linket might have a blacklist or whitelist of app identifiers. If the linket appears in an app in the whitelist, then the Registry returns the deep link to the querying device. If the linket appears in an app in the blacklist, the Registry does not return a deep link. But gives some error message.

A variant is where when the Registry decides that a webpage or app containing the linket is in a blacklist, then it sends a query to Bob's device. Warning him and asking him to explicitly press 'yes' to get the deep link associated with the linket Theta. Only if he does so will the deep link be downloaded to him.

The Registry itself might maintain a whitelist or blacklist. For just domains, for just apps or for both. One reason is that the blacklist might be of domains or apps implicated in malware. The Registry acts to protect its users against using those webpages or apps.

If there is a Registry blacklist and a blacklist made by a linket owner, then the interaction between these can be defined by a Registry policy. For example, the linket owner's blacklist could be applied first. If the domain or app passes this, then it is tested against the Registry blacklist. There is no need to do the latter if it fails the first test.

Likewise, suppose a domain is in an owner whitelist and in the Registry blacklist. The Registry could have a policy that the domain is ok [the owner whitelist overrides the Registry blacklist] or not [the Registry blacklist overrides the owner whitelist]. Ditto for an app in those lists.

We suggest that it is more important to test URLs or apps against a blacklist than against a whitelist. The blacklist is of dangers to the user. Whereas a whitelist might not be necessary to many linket owners. They typically want their linket to be in as many webpages or apps as possible. The linket is going viral, hopefully. So many users who have positive experiences interacting with the linket post the linket in their blogs, for example. The linket owner does not know a priori what domains or apps these blogs are on. But that is ok to the owner.

One reason for a whitelist from the linket owner is for promotional purposes. For some period of time, she might want to restrict who can use her linket to interact with her.

The whitelist is a list of exclusive domains or apps that users can use to do so. This is not a major constraint. Someone who gets her (current) deep link via this means can send the deep link to others or post it on a webpage or app outside the whitelist. A user clicking that deep link avoids using the Registry and can directly interact with her. But Jane's whitelist is a simple way to have a quick filter. Under some circumstances, for marketing purposes, she might actually want to encourage such bypassing. If someone is motivated enough to do that, Jane can see that as a positive endorsement.

The ability of a linket owner to have a blacklist or whitelist to try to control the use of its linket is a fundamental qualitative difference between linkets and webpages. For a conventional webpage at a domain, there is no analogous way for the domain owner to have those lists applied to other webpages with links to her webpage. If those links are syntactically correct, then by the earliest deliberate design of the Web, any webpage can link to any other.

But because a linket needs to be mapped to a deep link via a query to the Registry, interposing a test by the linket owner at the Registry is possible.

There is one limitation, pertaining to apps. See FIG. 7. For webpage 75, if the browser sends the URL Phi of the webpage to the Registry, then the tests of this section can be done. The browser is separate and independent of webpage 75. But if item 75 is an app, the app developers need to voluntarily let the app forward its id to the Registry. They do not have to comply. Or suppose the Registry requires that an app id go with a linket in a query. The app might send a fake id. An id on the whitelist of the linket.

5.2: Rating a Linket Using Webpages and Apps;

Separate from this discussion on black and white lists is the Registry using the webpages or apps in which a linket appears to rate the linket. This is in the flavour of the seminal Google insight by Page and Brin about ranking or rating a webpage. A webpage is of higher rank the more that reputable other webpages point to it.

Likewise, suppose a linket is in webpages at .mil or .gov domains, or the corresponding government related domains of several other countries (e.g. UK, Canada, Japan). These can be considered high quality pages. They raise the rank of the linket.

Suppose the linket appears in apps made or approved by the US government, or made by (say) IBM, National Geographic, Scientific American. Those apps could be considered reputable. In turn, these raise the rank of the linket.

The point is that the bidirectional nature of this section gives information to the Registry about where the linket appears, and hence to rate the linket.

A linket refers to a specific app. That app might be in several linkets. If those linkets have ratings, these can be used in part or entirely to derive a rating of the app. One method is a simple mean or median of the ratings of the linkets. Another might weight each linket rating by the number of times the linket was presented to the Registry. More elaborate means can be devised.

When the owner of a linket changes it from using app Alpha to using app Beta, then this can be used as a negative weighting or effect on the rating of Alpha. (Why is the linket turning away from Alpha?) The magnitude of the negative effect could also be a function of the rating of the linket. If a heavily used linket turns away from Alpha, that should have a greater lowering on Alpha's rating than if a lightly used linket stops using Alpha.

6: Transient Deep Link;

In submission 13, section 6 discussed "transient deep links". This was the case where linkets were not used. (The concept of the linket would be introduced in the submission 14.) Imagine Jane with her device at an Internet address. She makes a deep link referring to this address, like alpha://10.20.30.40. She conveys this to Bob by whatever means. But now Jane moves, and gets a new Internet address, 50.51.52.53. How can Bob find her when he only has the deep link with the old address? That section described how her app periodically surveils the Internet address of her device. When it changes, it sends the old and new addresses to the app server. Which keeps a record. When Bob uses the deep link, his alpha instance contacts 10.20.30.40. No reply. So his instance contacts the alpha server, giving it the old address 10.20.30.40. The alpha server looks across all the tables of old addresses, corresponding to different users like Jane. When it finds a table with the address 10.20.30.40, then it sends the new address associated with the table to Bob. So Bob's instance now contacts 50.51.52.53, where Jane's instance is waiting.

The case was for the entity that made the deep link moving. Now suppose Jane does not move. Bob moves so that his Internet address changes. How can Jane's app instance find his app instance?

Figure 8:
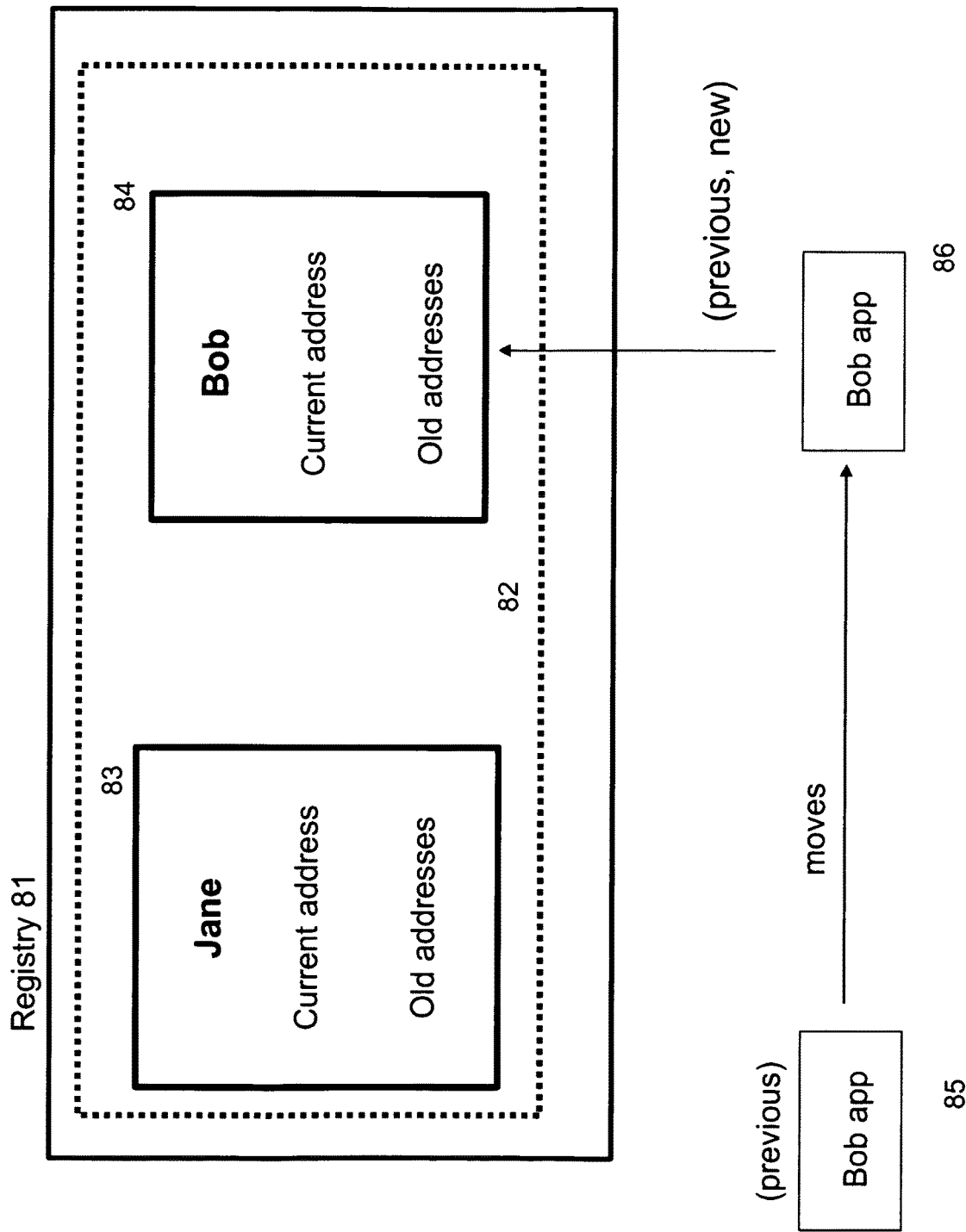
FIG. 8 shows Bob updating his address at the Registry.

The Registry can keep a data structure associated with Jane's linket. See FIG. 8. Registry 81 contains the data structure 82 (indicated by the dashed lines) of the Jane-Bob interaction. In this is the data 83 for Jane. One field is her current Internet address. Another field is her old addresses. A similar group is item 84 which is the data for Bob. One field is Bob's current address. Another field is Bob's old addresses. The fields of old addresses might be held as time ordered lists, in one implementation. Jane's app instance can update her part 83 and Bob's instance can update his part 84.

Item 85 is Bob's app at some time during the interaction. At item 85, Bob's app has an address which is also known to the Registry and is held in Bob's "current address" field of item 84.

He moves, which gives item 86. Bob's app surveils his device Internet address. When that changes to some new address, which is assumed to happen at item 86, the app sends the Registry his previous address and the new address. The Registry (just like the app server above), uses the previous address to find the appropriate data structure 84. It moves the contents of the current address field of the data structure into the list of Bob's old addresses. It moves the new address from the app message into the field of Bob's current address. Jane's instance loses contact with Bob, when it sends a message to his previous address. Her instance asks the Registry, giving Bob's previous address. The Registry replies with Bob's current address.

Similar methods can be done by the app server.

7: Telephone Number in Deep Link;

In our submission 10 and subsequently, we described the deep link having at minimum an app identifier and an Internet address. (An exception was where instead of an address, a string was used, which mapped at the app server to an address.) But what if instead of an Internet address, a phone number was used? This assumes the typical case where the mobile device is a phone or has phone functionality. So the deep link might look like "alpha://310-555-1212". For the phone number, we assume a US number, with 3 digits for the area code and 7 digits for the local number. For other countries, the reader can assume an appropriate format. We also use the informal US convention for a local number of writing 555-1212. We ignore the case where the phone number has the country code, used for international calls. The example can be easily modified to include this case.

Without restriction, we assume that the deep link is made in one of two formats. As an Internet address, where dots separate the address fields. Exor as a phone number, where dashes are used in place of dots. This lets a parsing routine easily determine whether it has an Internet address or a phone number.

The phone is also assumed to have an Internet connection, with a temporary Internet address. If our user Jane makes the above deep link, how can another user Bob who gets the deep link connect his app instance to her app instance?

7.1: Use Phone Carrier to Access Internet;

There are 2 cases. First, consider where Jane accesses the Internet via her phone carrier. Purely by way of example, suppose the carrier is ATT Corp. This is fungible. The reader can replace it with another phone carrier.

Figure 9:
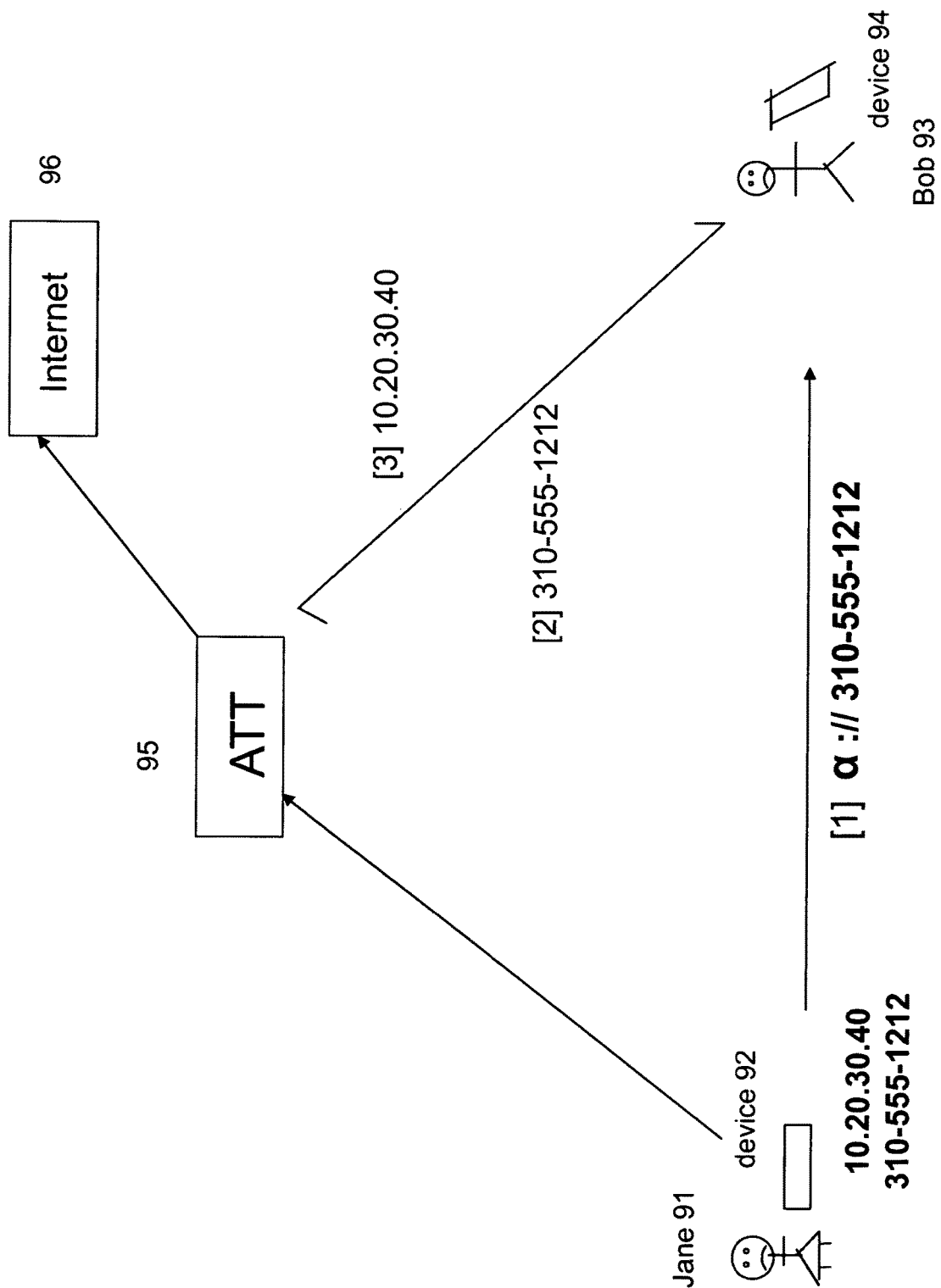
FIG. 9 shows Jane accessing the Internet via a phone carrier.

See FIG. 9. Jane 91 has her device 92. It has the Internet address 10.20.30.40 and the phone number 310-555-1212. She goes to the Internet 96 via ATT 95.

Her Alpha app instance makes the deep link as above. It is sent or promulgated by various means. Bob 93 with his device 94 gets the deep link in step [1]. We assume his device is a phone and can contact the phone network. His device parses the deep link and sees that it is in the format of a phone number. It sees that the area code is 310. Device 94 uses the phone number to contact the appropriate telecom provider that issued that number. There has been long standing functionality in the phone network to do this. Step [2] shows Bob's phone sending the phone number to ATT.

ATT knows that Jane's Internet address is 10.20.30.40 because ATT issued it to her on a temporary basis. And ATT is her phone provider. So when it is asked with her phone number, it replies to Bob's device 94 with 10.20.30.40 in step [3]. Now his device knows the app id (alpha) and her Internet address. It proceeds as in submission 10 to contact her app instance on the Internet.

7.2: Use Hot Spot to Access Internet;

Now consider where Jane accesses the Internet via a hot spot. The latter might use WiFi, WiMax or another appropriate hot spot wireless technology. This is slightly more involved because the phone carrier does not issue the Internet address.

Figure 10:
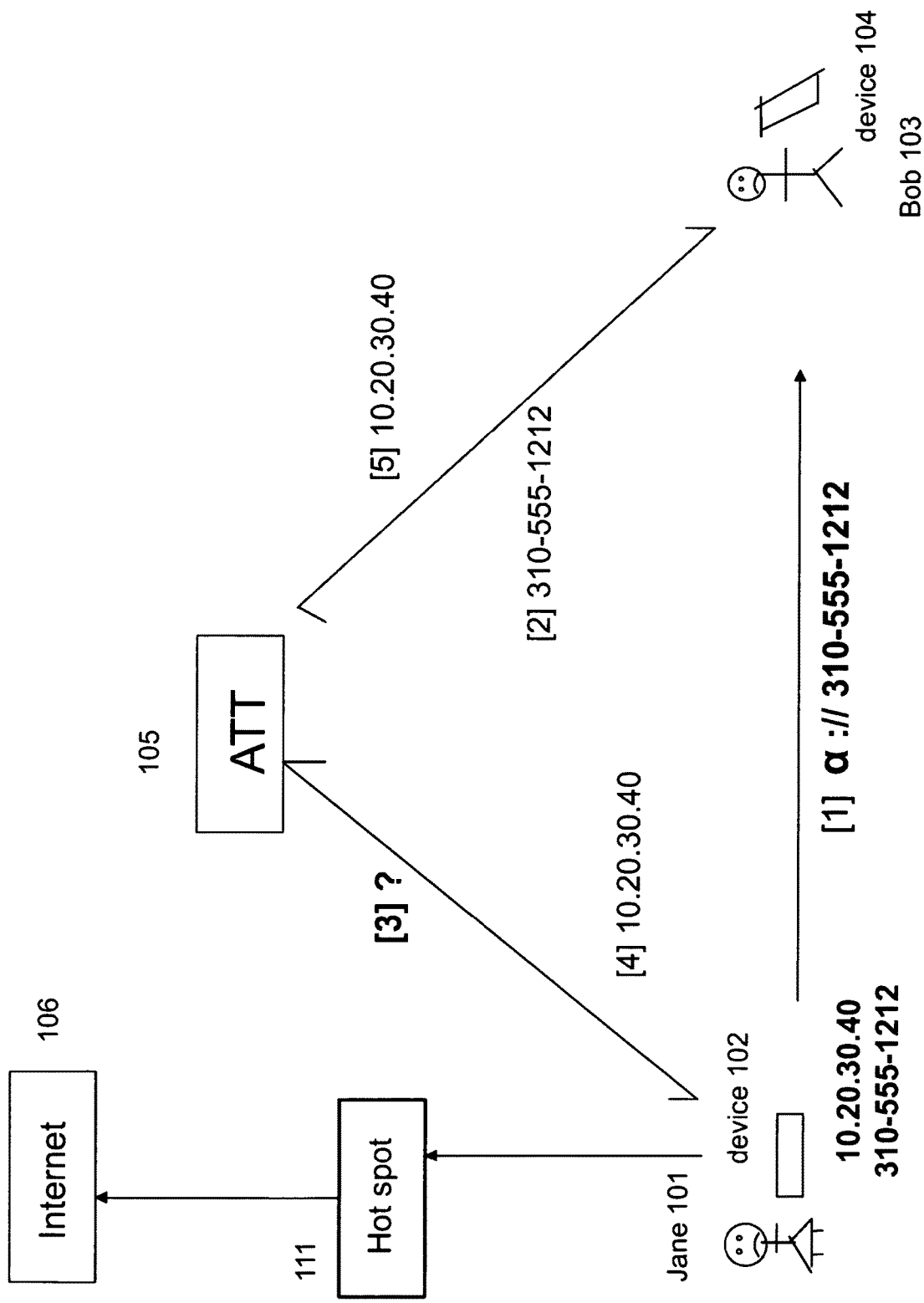
FIG. 10 shows Jane accessing the Internet via a hot spot.

See FIG. 10. Now Jane phone device 102 uses hot spot 111 to get to the Internet 106. We assume that the hot spot assigned her the temporary Internet address 10.20.30.40.

Step [1] is as before. Ditto for step [2]. In this step, ATT gets the phone number 555-1212 and is asked for the corresponding Internet address. In step [3] it asks Jane phone device 102. This is indicated by the question mark in step [3] in FIG. 10. The phone operating system can answer this query, if such an address exists. This might involve it making a popup window on its screen, telling Jane that her carrier wants to know her Internet address. Does she agree to divulge this or not? Or the phone might reply to ATT automatically, without any manual involvement by her. This might be preset by her at some earlier time. Plausible because she has promoted her deep link, so she wants someone to reply using the data in it.

Instead of the phone operating system answering the query from the provider, there might be an app running on the phone. The provider sends the query in a format or manner accessible to the app. The app has access to the phone's Internet address. It can do the steps in the previous paragraph to answer the provider.

Her phone replies to ATT with her Internet address in step [4]. ATT in step [5] transmits this to Bob's device 104. The interaction between the phones then proceeds as discussed in earlier submissions.

Comparing FIGS. 9 and 10, we see that using a hot spot to access the Internet leads to 2 extra steps. But provided that the phone and carrier implement a simple query feature, this is doable. More broadly, if a deep link uses a phone number, the Internet address can be found. But clearly, it is preferable for the deep link to simply have the Internet address, to obviate the steps of this section.

I claim:

1. A method comprising:
a server running a first instance of an application in a first virtual machine, in streaming mode, in a first data center;
displaying, by the first instance, a window of the application on a first mobile device;
creating, by the first instance, a deep link, wherein the deep link has an id of the application and a network address of the first mobile device;
transmitting, by the first instance, the deep link to a second mobile device;
receiving, by the server, the network address of the first mobile device from the second mobile device;
running, by the server, a second instance of the application in a second virtual machine, in streaming mode;
displaying, by the second instance, a window of the application on the second mobile device; and
the first and the second instances interacting.

2. The method of claim 1, further comprising:
transmitting the deep link, wherein the transmitting is performed by the first instance creating a barcode of the deep link;
displaying, by the first instance, the barcode in the window of the application on the first mobile device.

3. The method of claim 1, further comprising:
receiving, by the server, a message from the second instance;
extracting, by the server, a destination network address, wherein the destination network address is the network address of the first mobile device;
routing, by the server, the message in a path inside the first data center to the first instance.

4. The method of claim 1, further comprising:
deploying the server across a plurality of tertiary data centers, wherein the tertiary data centers are different from the first data center;
receiving, by the server, the network address from the second mobile device;
for each tertiary data center, estimating, by the server, a sum of a first transmission time between the first mobile device and the tertiary data center, and a second transmission time between the tertiary data center and the second mobile device;
identifying, by the server, from the plurality of tertiary data centers, a second data center with a minimum sum;
migrating, by the server, the first instance from the first data center to the second data center;
creating, by the server, the second instance in the second data center.

5. The method of claim 4, further comprising notifying, by the server, the first mobile device of a network address of the second data center where the first instance runs.

6. The method of claim 4, further comprising notifying, by the first instance running on the second data center, the first mobile device of the network address of the second data center.

7. The method of claim 1 further comprising:
deploying, by the server, virtual machines in a plurality of tertiary data centers;
receiving, by the server, the network address of the first mobile device from the second mobile device;
for each tertiary data center and for the first data center, estimating, by the server, a sum of:
a first transmission time between the first mobile device and a tertiary data center, twice of a second transmission time between the tertiary data center and the first data center, and a third transmission time between the tertiary data center and the second mobile device;
identifying, by the server, a second data center with a minimum sum;
migrating, by the server, the first instance and the second instance from the first data center to the second data center.

8. The method of claim 7, further comprising notifying, by the server, the first mobile device of a network address of the second data center where the first instance runs.

9. The method of claim 7, further comprising notifying, by the first instance running on the second data center, the first mobile device of the network address of the second data center.

10. The method of claim 4, further comprising:
three or more mobile devices;
for each tertiary data center, estimating, by the server, a sum of a transmission time between each mobile device and the tertiary data center;
identifying, by the server, a given tertiary data center with a minimum sum;
installing, by the server, the virtual machines, corresponding to each mobile device, in the given tertiary data center.

* * * * *